(12) United States Patent
Friedel et al.

(10) Patent No.: US 7,258,524 B2
(45) Date of Patent: Aug. 21, 2007

(54) METHOD OF REGULATING THE FLOW RATE OF AIR IN A ROTARY SHAFT OF A TURBOMACHINE

(75) Inventors: Jerome Marcel Friedel, Blandy les Tours (FR); Jean-Pierre Andre Joseph Mourlan, Nogent sur Marne (FR); Daniel Georges Plona, Vulaines/Seine (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 11/279,812

(22) Filed: Apr. 14, 2006

(65) Prior Publication Data

US 2006/0239812 A1 Oct. 26, 2006

(30) Foreign Application Priority Data

Apr. 21, 2005 (FR) .................................. 05 03989

(51) Int. Cl.
*F01D 5/08* (2006.01)
*F01D 25/08* (2006.01)

(52) U.S. Cl. ..................... 415/115; 415/144; 415/111; 137/47

(58) Field of Classification Search ............... 415/110, 415/111, 115, 144; 137/47, 53
See application file for complete search history.

(56) References Cited

U.S. PATENT DOCUMENTS 1,844,659 A 2/1932 Horstman
2,648,895 A * 8/1953 Davis ....................... 29/897.1
2,906,494 A * 9/1959 McCarty et al. .......... 416/96 R
3,575,528 A 4/1971 Beam, Jr. et al.
4,296,599 A * 10/1981 Adamson .................... 60/39.23
4,807,433 A * 2/1989 Maclin et al. ................. 60/795
5,054,996 A * 10/1991 Carreno ..................... 415/115

FOREIGN PATENT DOCUMENTS

| DE | 21 21 281   | 11/1972 |
| EP | 0 468 782 A3 | 1/1992  |
| FR | 2 146 715   | 3/1973  |
| JP | 58-77127    | 5/1983  |

\* cited by examiner

*Primary Examiner*—Edward K. Look
*Assistant Examiner*—Nathan Wiehe
(74) *Attorney, Agent, or Firm*—Oblon, Spivak, McClelland, Maier & Neustadt, P.C.

(57) ABSTRACT

A device applied to regulating the flow rate of air flowing in a rotary shaft of a turbomachine, the shaft including at least one through orifice for passing air. The device at least one shutter member for shutting the orifice and secured to a deformable blade presenting bi-linear behavior, the blade being secured to the shaft and being suitable for deforming under the effect of the centrifugal force that results from the shaft rotating such that the shutter member is suitable for taking up two different positions depending on the speed of rotation of the shaft: one position in which it shuts the orifice; and another position in which it releases the orifice to allow air to pass through.

7 Claims, 5 Drawing Sheets

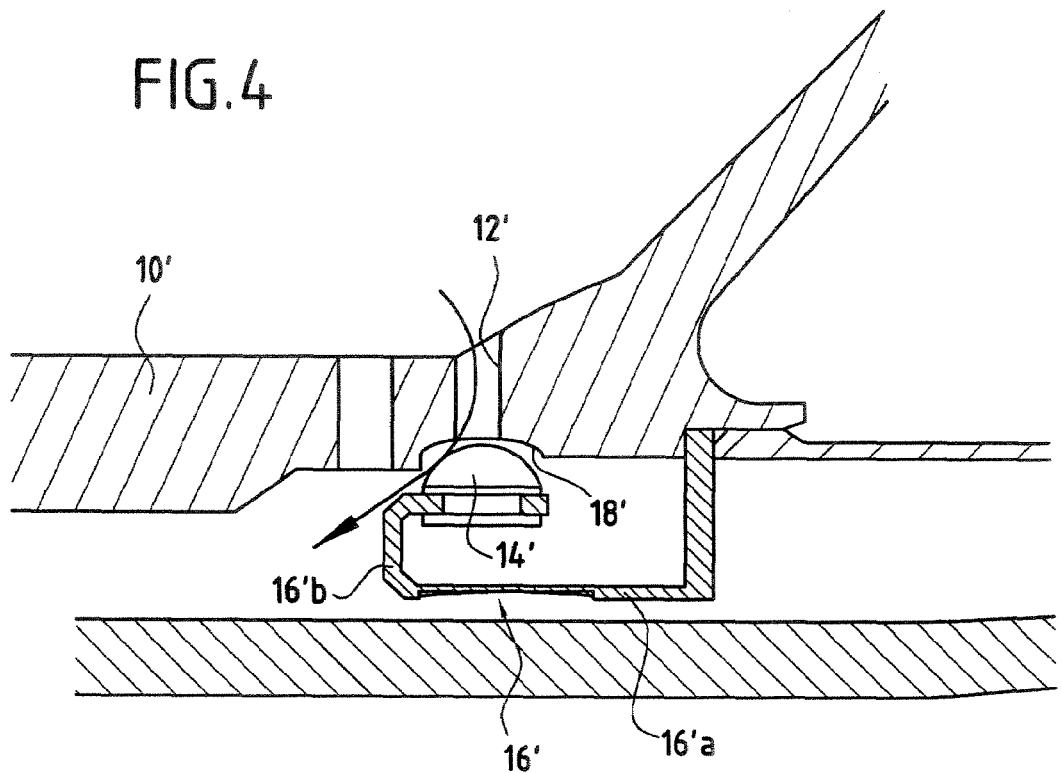
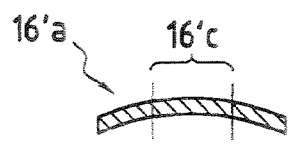

METHOD OF REGULATING THE FLOW RATE OF AIR IN A ROTARY SHAFT OF A TURBOMACHINE

BACKGROUND OF THE INVENTION

The present invention relates to a device for regulating the flow rate of air flowing in a rotary shaft of a turbomachine, and in particular in a compressor shaft of such a turbomachine.

In a turbomachine, it is common practice to take air for various purposes, in particular to regulate the pressurization of oil enclosures so as to prevent oil leaks, or to cool certain parts of the turbomachine.

The functions of pressurizing and cooling these portions of the turbomachine are performed by taking air that normally comes from the high and low pressure compressors of the turbomachine, with the choice depending on the temperature and pressure conditions desired for the air that is taken. Air as taken in this way generally passes inside the shafts of the compressor or the turbine so as to be delivered to the oil enclosures for pressurizing or to the components of the turbomachine that need cooling.

The taking of air from the high and low pressure compressors thus depends on the speed of rotation of the shaft driving those compressors. For pressurizing oil enclosures, it becomes necessary, at low speeds, to take air that is highly compressed in order to ensure good sealing of the oil enclosures.

However, taking highly compressed air at high speed is harmful for the lifetimes of sealing systems. It can lead to certain sensitive parts of the turbomachine being heated excessively, and that is penalizing in terms of performance.

European patent No. 0 698 739 B1 discloses a device for taking air that comprises a toroidal shell placed in a wall that is swept by a flow of air, the shell being suitable for pivoting about an axis to go from a position in which it projects maximally from the wall to a position in which it is retracted in the wall. Nevertheless, that device does not enable the flow rate of the air that is taken to be regulated as a function of the requirements for air.

OBJECT AND SUMMARY OF THE INVENTION

A main object of the present invention is thus to mitigate such drawbacks by proposing a device for regulating the flow rate of air in a rotary shaft of a turbomachine as a function of the air requirements of the turbomachine component that is to be pressurized or cooled in order to optimize the overall performance of the turbomachine.

To this end, there is provided a device for regulating the flow rate of air flowing in a rotary shaft of a turbomachine, the shaft including at least one orifice passing therethrough to pass the air, the device comprising at least one shutter member for shutting the orifice and secured to a deformable blade presenting bi-linear behavior, the blade being secured to the shaft and being suitable for deforming under the effect of the centrifugal force that results from the shaft rotating such that the shutter member is suitable for taking up two different positions depending on the speed of rotation of the shaft: one position in which it shuts the orifice; and another position in which it releases the orifice to allow air to pass through.

The invention consists in using the effects of the centrifugal force that results from the shaft rotating to modulate the flow section for the air flowing through the shaft and intended for pressurizing or cooling certain portions of the turbomachine. The valve of the device of the invention is placed in a position that is appropriate as a function of the looked-for effect: initially, it either closes or opens the orifice in the shaft. Under the effect of centrifugal force, and depending on the initial position of the valve, the solid blade of the valve deforms, thereby releasing or closing the orifice in the shaft.

The use of a blade presenting bi-linear behavior gives results that are reliable in terms of opening and closing the orifice in the shaft. A blade presenting bi-linear behavior makes it possible to obtain opening and closing of the orifice in the shaft that is not progressive and proportional to the speed of rotation of the shaft, but that is substantially instantaneous at a predetermined speed of rotation of the shaft.

As a result, it is possible to trigger the opening and the closing of the orifice of the shaft solely at predetermined speeds of rotation of the shaft that correspond to operating speeds of the turbomachine for which the flow section for the air flowing in the shaft needs to be modified. Thus, the flow rate of the air flowing in the rotary shaft of the turbomachine is regulated as a function of the real requirements for air of the element of the turbomachine that is to be pressurized or cooled.

According to an advantageous characteristic of the invention, the deformable blade presents a right section that is curved perpendicularly to its direction of deformation. Under such circumstances, the section of the blade that is curved is preferably substantially parallel to the axis of rotation of the shaft.

The device of the invention may further comprise an abutment element for enabling the shutter member to be held in position when it releases the orifice in the shaft.

The deformable blade and the shutter member of the device of the invention can be secured to the outside of the shaft, the shutter member being placed in such a manner as to close the orifice of the shaft at speeds of rotation of the shaft below a predetermined speed, and to release the orifice at speeds above a predetermined speed.

Alternatively, the deformable blade and the shutter member can be secured to the inside of the shaft, the shutter member being disposed in such a manner as to release the orifice in the shaft below a predetermined speed of rotation of the shaft, and to close the orifice above a predetermined speed of rotation.

The present invention also provides a turbomachine compressor shaft including a device for regulating air flow rate as defined above.

BRIEF DESCRIPTION OF THE DRAWINGS

Other characteristics and advantages of the present invention appear from the following description made with reference to the accompanying drawings which show an embodiment that presents no limiting character. In the figures:

FIGS. 4, 4A, 5, and 5a are fragmentary section views of a turbomachine shaft fitted with a regulator device in another embodiment of the invention, and shown in two different positions.

DETAILED DESCRIPTION OF THE EMBODIMENT

Figure 1:
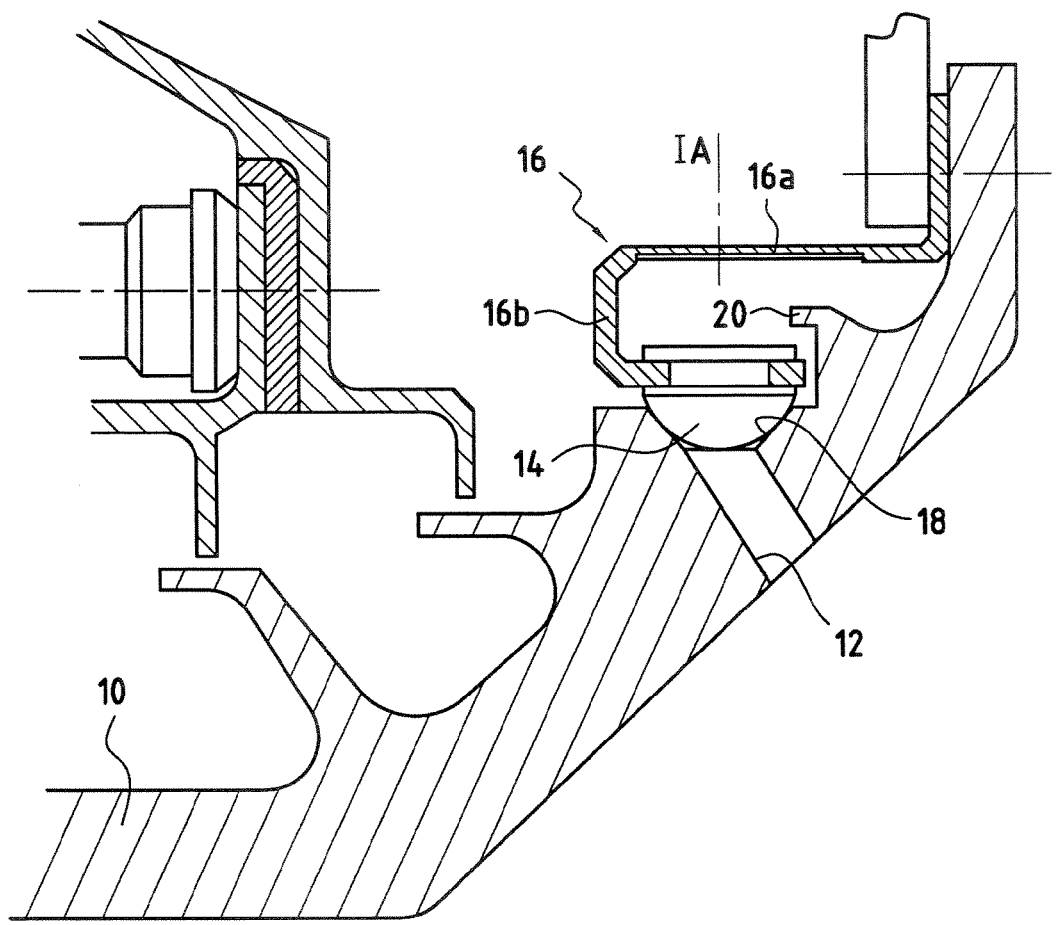
FIGS. 1, 1A, 2, and 2A are fragmentary section views of a turbomachine shaft fitted with a regulator device in an embodiment of the invention which is shown in two different positions.
Figure 2:
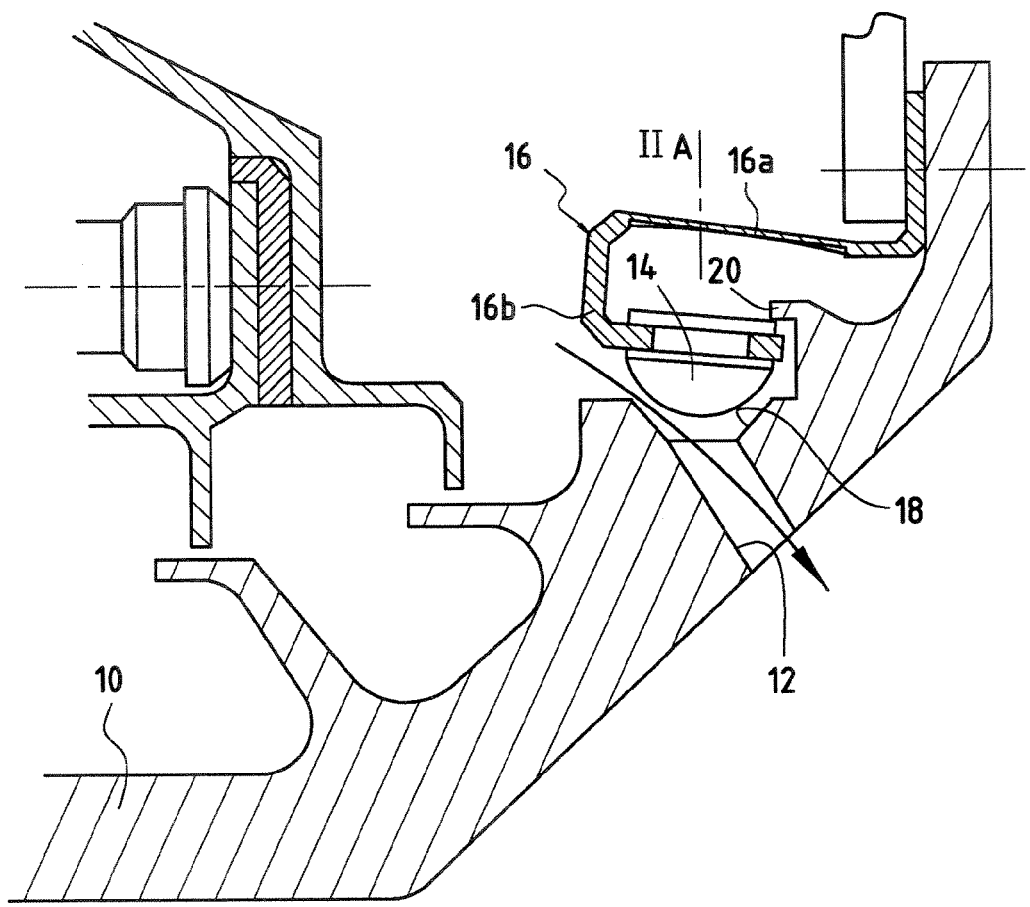

FIGS. 1 and 2 show part of a rotary shaft 10 of a turbomachine, the shaft being fitted with a device for regulating the flow rate of air that flows within the shaft.

The shaft 10 may be a high or low pressure compressor shaft of the turbomachine, or it may be a turbine shaft. The shaft 10 is centered on a longitudinal axis X-X of the turbomachine, about which it revolves.

The rotary shaft 10 is provided with at least one orifice 12 passing through it to pass air. Air that has penetrated into the shaft 10 via the orifice(s) 12 thus flows inside the shaft from upstream to downstream and/or from downstream to upstream.

The air flowing in the shaft 10 can be taken from a low-pressure compressor of the turbomachine and/or from the high-pressure compressor thereof. It may be used for pressurizing oil enclosures situated upstream or downstream in the turbomachine or for cooling certain portions of the turbomachine, for example the turbine blades.

The purpose of the device of the invention is to regulate the flow rate of the air flowing in such a rotary shaft 10 by modulating the way air is taken as a function of the requirements for pressurization or for cooling.

To this end, the device for regulating the air flow rate comprises at least one member 14 for shutting the orifice 12. This member 14 is secured to a deformable blade 16 which is itself secured to the rotary shaft 10. The shutter member 14 may present a right section that is semicircular in shape, and the orifice 12 in the shaft may be provided with a conical seat 18 on which the shutter member rests to avoid any leakage of air.

In the embodiment of FIGS. 1 and 2, the blade 16 and the shutter member 14 of the regulator device are located outside the rotary shaft 10.

The blade 16 is suitable for deforming under the effect of the centrifugal force that results from the shaft 10 rotating, such that the shutter member 14 is suitable for taking up two different positions depending on the speed of rotation of the shaft; one position in which it shuts the orifice (FIG. 1), and another position in which it releases the orifice so as to allow air to pass through (FIG. 2).

More precisely, the shutter member 14 is disposed so as to shut the orifice 12 in the shaft 10 at speeds of rotation of the shaft below a predetermined speed (FIG. 1), and to release the orifice at speeds of rotation above the predetermined speed (FIG. 2). The shutter member 14 must naturally present sufficient mass to enable it to deform the blade 16 under the effect of centrifugal force.

A shoulder 20 of the rotary shaft 10 can constitute an abutment for preventing the shutter member 14 from moving once it has released the orifice 12 in the shaft 10. Such an abutment thus serves to avoid excessive deformation of the blade 16 secured to the shutter member 14.

The blade 16 is of the type presenting bi-linear behavior, i.e. deformation of the blade alters the distribution of traction and compression zones in its working section. It can be made of a stainless steel that withstands high temperatures and it can present a working portion 16a (i.e. the zone of the blade in which deformation is the most marked) that extends preferably substantially parallel to the axis of rotation X-X of the shaft 10.

The working portion 16a of the blade 16 is secured at one of its ends to the rotary shaft 10. At its opposite end, the working portion of the blade presents a bend 16b having the shutter member 14 secured thereto.

Figure 1A:
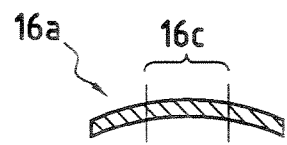
Figure 2A:
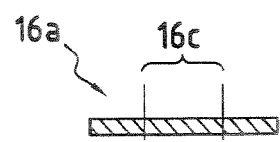

As shown in FIGS. 1A and 2A, the working portion 16a of the blade 16 possesses a "neutral fiber" region 16c in its central zone, i.e. a region of the working portion of the blade that is not stressed after the blade has deformed.

In its initial position corresponding to shutting the orifice 12 (FIG. 1), the working portion 16a of the blade 16 presents a right section that is curved perpendicularly to its deformation direction (i.e. the working portion 16a of the blade is in the form of a circular arc facing towards the axis of rotation X-X of the shaft (FIG. 1A)).

When the blade 16 is subjected to the effect of centrifugal force (FIG. 2), the regions of the working portion 16a of the blade that are situated on either side of the neutral fiber region 16c are highly stressed in compression and in traction. The blade 16 thus moves initially for the most part merely in compression and deforms only very slightly so that the shutter member 14 remains substantially in its initial position.

As centrifugal force increases, the right section of the working portion 16a of the blade 16 becomes modified and the balance of forces between bending and compression becomes reversed. The blade 16 then works for the most part merely in bending and the force needed to deform the blade becomes much smaller, such that the shutter member 14 moves into its other position, thus releasing the orifice 12 (FIG. 2). In this position, the working portion 16a of the blade 16 presents a right section substantially as shown in FIG. 2A.

Figure 3:
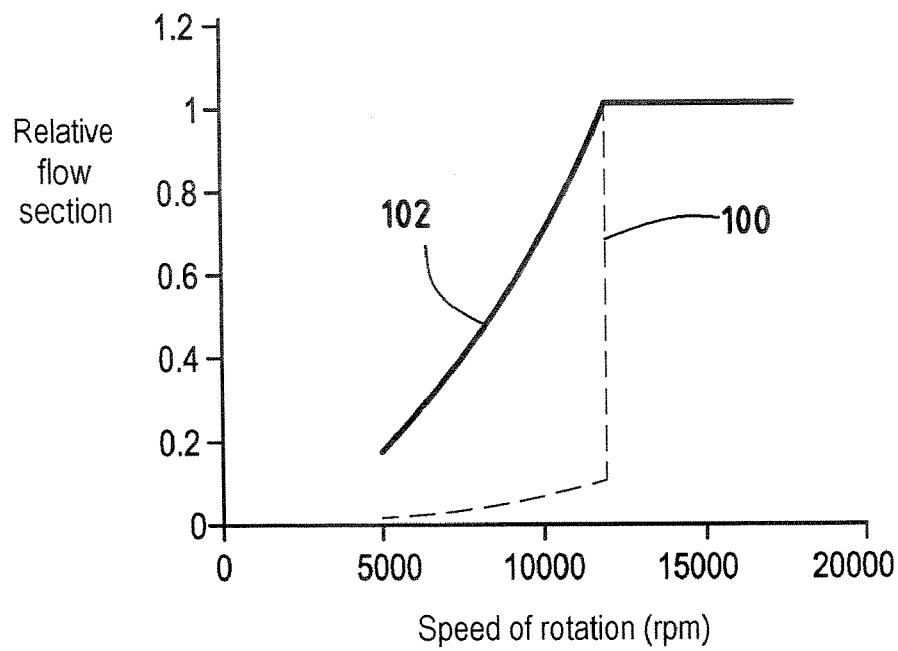
FIG. 3 is a graph plotting a curve showing the aperture section of the through orifice in the shaft of FIGS. 1 and 2, as a function of the speed of rotation of the shaft.

The way in which the orifice 12 in the shaft 10 is opened and closed by the regulator device of the invention is illustrated by FIG. 3. In this figure, the curve 100 plots the aperture section relative to the orifice 12 in the rotary shaft 10 of FIGS. 1 and 2 for the regulator device of the invention as a function of the speed of rotation of the shaft (expressed in revolutions per minute (rpm)). The curve 102 is associated with an equivalent regulator device for which the deformable blade nevertheless behaves in linear manner, i.e. by working solely in bending.

The curve 102 shows that with a blade having linear behavior, the orifice opens in a manner that is progressive and proportional to the speed of rotation of the shaft. In addition, the aerodynamic forces that act on the shutter member are superposed on the centrifugal force and thus prevent the orifice opening or closing completely. With that type of technology, the amount of air taken can thus turn out to be excessive at certain speeds of operation of the turbomachine, thus leading to certain sensitive parts becoming overheated, thereby degrading the efficiency of the turbomachine.

In contrast, with the blade presenting bi-linear behavior of the regulator device of the invention (curve 100), the orifice becomes fully open in a manner that is instantaneous at a speed of rotation of the shaft that is predetermined (in this example at about 12,000 rpm). Similarly, the opening becomes fully closed, likewise in a manner that is instantaneous.

By acting on the thickness and the shaft of the working portion of the blade of the regulator device, it is possible to adjust the speed of rotation of the shaft at which it is desired to trigger opening and full closing of the orifice.

As a result, it is possible to control the opening and closing of the orifice, and thus to adjust the quantity of the air flow that is taken as a function of the real needs for pressurization or cooling. The overall performance of the turbomachine is thus improved.

There follows a description of an embodiment of the regulator device of the invention as shown in FIGS. 4, 4A, 5, and 5A.

Compared with the embodiment described above, the deformable blade 16' and the shutter member 14' of the device in this embodiment are located inside the rotary shaft 10'.

Figure 5:
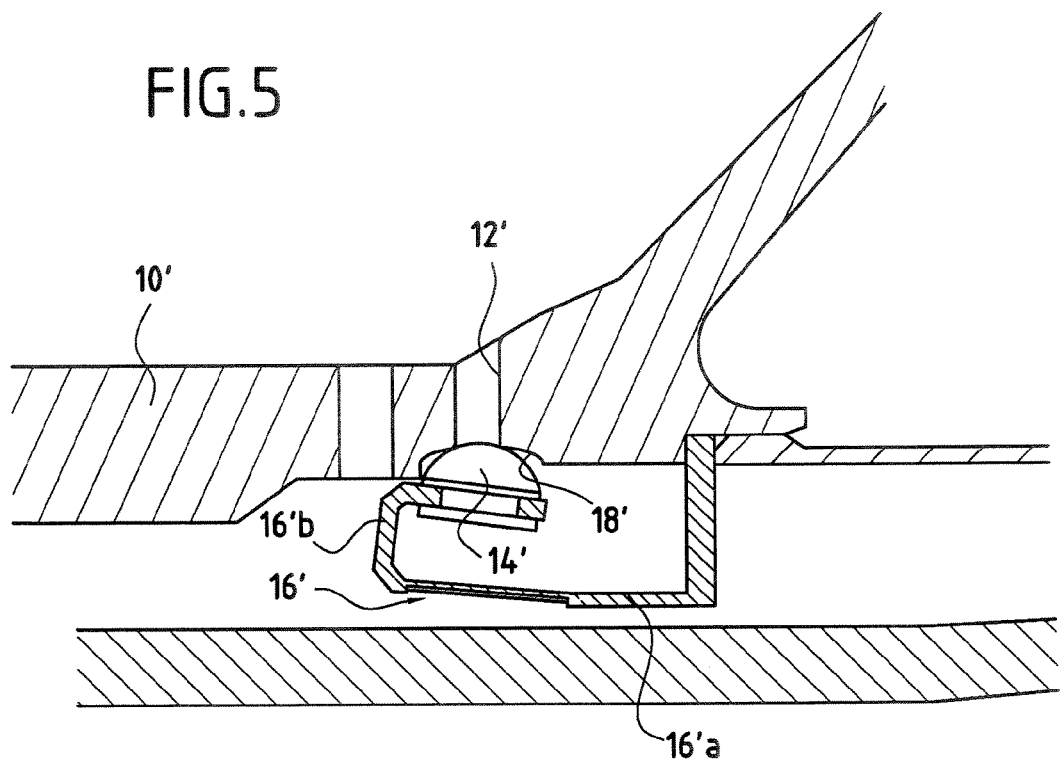
Figure 5A:
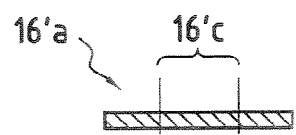

In addition, the shutter member 14' is disposed so as to release the orifice 12' of the shaft 10' at speeds below a predetermined speed of rotation of the shaft (FIG. 4) and to shut the orifice 10' at speeds above a predetermined speed of rotation (FIG. 5).

The deformable blade 16' presenting bi-linear behavior also presents a working portion 16'a that extends substantially parallel to the axis of rotation X'-X' of the shaft 10'. This working portion 16'a is secured at one of its ends to the rotary shaft 10' and at its opposite end it presents a bend 16'b having the shutter member 14' secured thereto.

In its initial position corresponding to opening the orifice 12' (FIGS. 4 and 4A), the working portion 16'a of the blade 16' is curved perpendicularly to its deformation direction. In its position corresponding to shutting the orifice 12' (FIGS. 5 and 5A), the working portion 16'a of the blade 16' presents a right section that is substantially straight.

The way in which the blade 16' of the regulator device in this embodiment of the invention deforms is identical to that described with reference to the above-described embodiment.

Figure 6:
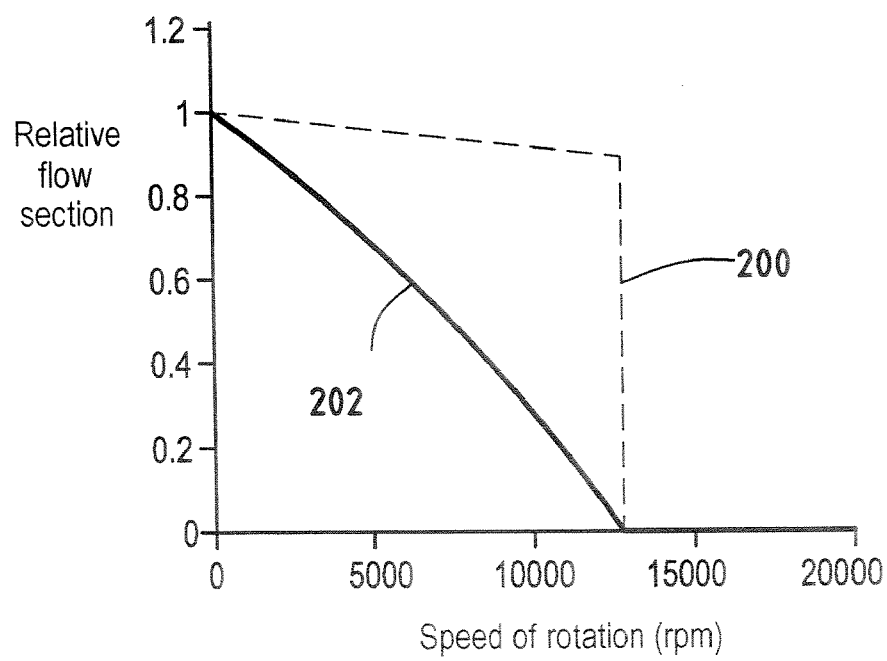
FIG. 6 is a graph plotting the aperture section of the through orifice in the shaft of FIGS. 4 and 5 as a function of the speed of rotation of the shaft.

The orifice 12' in the shaft 10 is opened and closed in the manner illustrated by FIG. 6. The curves 200 and 202 represent the relative aperture section of the orifice 12 in the rotary shaft 10 as a function of the speed of rotation of said shaft (expressed in rpm), respectively for the regulator device of the invention, and for an equivalent regulator device using a deformable blade presenting linear behavior.

As with the above-described embodiment, it can clearly be seen that with this type of deformable blade presenting bi-linear behavior (curve 200), the orifice in the shaft is fully closed in instantaneous manner at a predetermined speed of rotation of the shaft, whereas with a blade presenting linear behavior (curve 202), the orifice is closed progressively in a manner that is proportional to the speed of the rotation of the shaft.

The present invention thus makes it possible to regulate the flow rate of air delivered by the (high-and/or low-pressure) compressor of the turbomachine as a function of the exact requirements for pressurizing or cooling certain portions of the turbomachine. The quantity of air that is taken thus corresponds specifically to the requirements of the element that is to be pressurized (such as an oil enclosure) or that is to be cooled (such as a turbine blade). Air flow rate is regulated in a manner that is self-contained and independent of other regulator systems in the turbomachine, and it operates without requiring actuators. The performance of the turbomachine is thus improved thereby.

The regulator device of the invention can be applied to regulating the pressure in oil enclosures of the turbomachine, e.g. by taking air from the high-pressure compressor during critical stages in the operation of the turbomachine (starting and idling), and by switching air takeoff to the low-pressure compressor when the operating speed of the turbomachine is higher and the pressure of the air taken from the low-pressure compressor is sufficient on its own to ensure that the oil enclosures are leaktight.

The regulator device of the invention may also be applied to cooling a moving blade in the high-pressure turbine of the turbomachine. Air is then taken from a stage of the high-pressure compressor (it may also be taken from the end of the combustion chamber), it flows along the shaft of the turbine, is compressed along the disk of the high-pressure turbine, and is then injected into the blade cooling circuit via the root of the blade.

What is claimed is:

1. A device for regulating the flow rate of air flowing in a rotary shaft of a turbomachine, the shaft including at least one orifice passing therethrough to pass the air, the device comprising at least one shutter member for shutting the orifice and secured to a deformable blade presenting bi-linear behavior, the blade being secured to the shaft and being suitable for deforming under the effect of the centrifugal force that results from the shaft rotating such that the shutter member is suitable for taking up two different positions depending on the speed of rotation of the shaft: one position in which it shuts the orifice; and another position in which it releases the orifice to allow air to pass through.

2. A device according to claim 1, wherein the deformable blade presents a right section that is curved perpendicularly to its direction of deformation.

3. A device according to claim 2, wherein the section of the deformable blade that is curved is substantially parallel to an axis of rotation of the shaft.

4. A device according to claim 1, further comprising an abutment element for enabling the shutter member to be held in position once it has released the orifice in the shaft.

5. A device according to claim 1, wherein the deformable blade and the shutter member are located outside the shaft, the shutter member being disposed in such a manner as to shut the orifice in the shaft at a speed below a predetermined speed of rotation of the shaft, and to release the orifice at a speed above the predetermined speed of rotation.

6. A device according to claim 1, wherein the deformable blade and the shutter member are located inside the shaft, the shutter member being disposed in such a manner as to release the orifice in the shaft at speeds below a predetermined speed of rotation of the shaft, and to open the orifice at speeds above the predetermined speed of rotation.

7. A turbomachine compressor shaft, including a device for regulating air flow rate according to claim 1.

* * * * *